Jan. 28, 1930.  F. W. BUSER  1,745,292
PLANT EXTRACTOR
Filed June 22, 1927
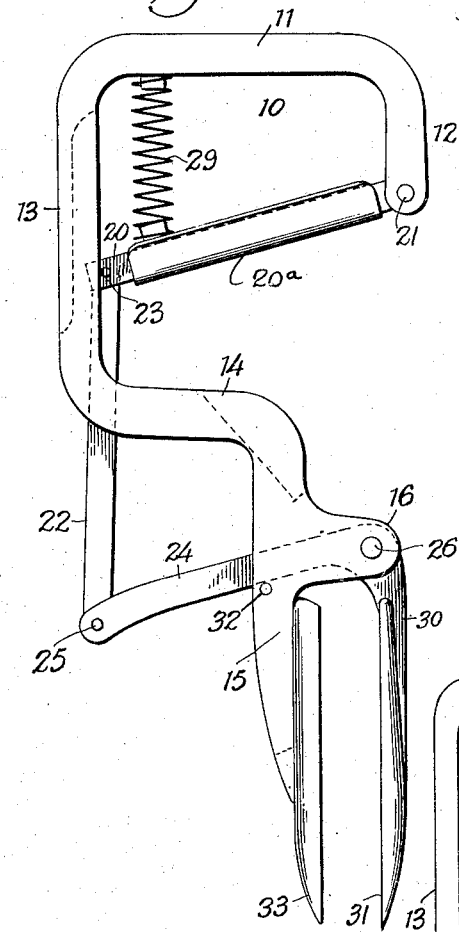
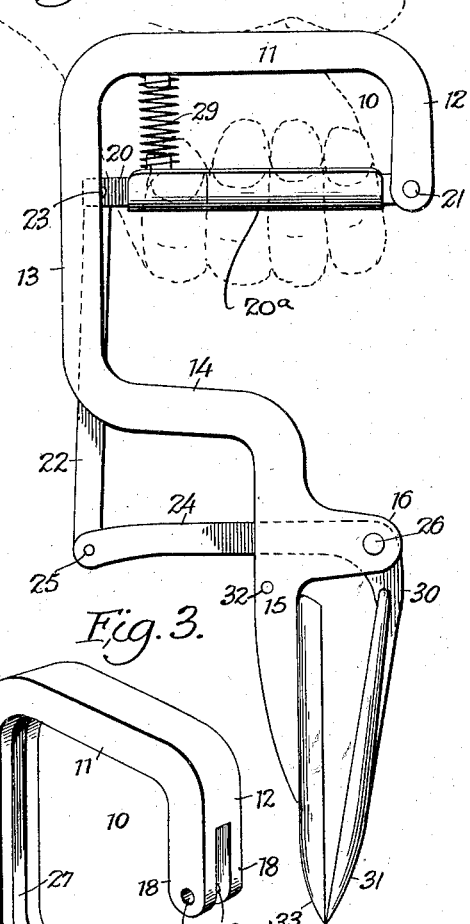
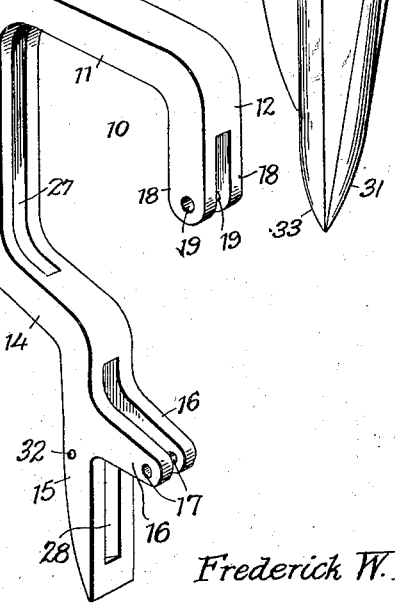
Inventor,
Frederick W. Buser,
By Hodges Hopkins
Attorney Patented Jan. 28, 1930

1,745,292

UNITED STATES PATENT OFFICE

FREDERICK W. BUSER, OF WASHINGTON, DISTRICT OF COLUMBIA

PLANT EXTRACTOR

Application filed June 22, 1927. Serial No. 200,708.

This invention relates to that class of implements used for the purpose of extracting plants from the earth and has for its primary object the provision of a device of this character which is substantial, economical of manufacture, effective in its operation, and simple in construction.

With the above and other objects in view, which will appear as the description progresses the invention resides in the novel construction and combination of parts hereinafter described and claimed.

In the accompanying drawings Figure 1 is a side elevation of the invention showing the blades spaced apart or in normal position.

Figure 2 is a like view showing the tips of the blades drawn together for extracting a plant from the earth.

Figure 3 is a perspective view of the staff of the device by which the movable elements thereof are supported. The frame of the device is substantially of the configuration of an interrogation point and has a substantially square hand grip at one of its ends and terminates in a blade-like portion at the other of its ends, the said blade-like portion being in vertical alinement with the center of the hand grip.

Referring to the drawings for a more particular description of the invention reference character 10 indicates the staff generally which is formed at its upper portion into horizontal hand-grip 11 having a downwardly extending leg 12 at one of its ends and downwardly extending portion 13 at its other end being extended at right angles to a point directly under the approximate center of the hand-grip 11 as at 14, thence carried directly downwardly and at right angles to hand-grip 14, forming blade portion 15 which is provided with ears 16 apertured as at 17. Leg 12 is bifurcated at its lower end forming ears 18, having therethrough apertures 19. Operating bar 20 is pivotally related to leg 12 by means of pivot pin 21 at one of its ends, and pivotally related at the other of its ends to the upper end of link 22 as at 23. Operating bar 20 is provided with guard 20ª. Link 22 is pivotally related at its lower end to one end of bell crank lever 24 as at 25. Bell crank lever 24 is pivotally related to thrust 15 through the medium of ears 16 as at 26. Portions 13 and thrust 15 are suitably recessed as at 27 and 28 respectively to permit of the free movement of operating bar 20 and lever 22 and bell crank lever 24. The lower end of thrust 15 terminates in blade 33 which may be termed the fixed or stationary blade and the downwardly extending portion 30 of bell crank lever 24 terminates in a cooperative blade 31. Blades 33 and 31 may be formed as integral parts of thrust 15 and bell crank lever 24 respectively and are formed U-shaped in cross section and beveled at their ends or they may be formed separately and affixed thereto. As shown in the drawings, the blades are affixed to the relative downwardly extending portions 15 and 30.

A compression spring 29 is interposed between hand-grip 11 and operating bar 20 for the purpose of forcing bar 20 downwardly and maintaining a spaced or normal position of blades 33 and 31 as clearly shown in Figure 1. Stop 32 which may be of any desired construction is interposed in recess 28 of thrust 15 for limiting the downward movement of the arm of bell crank lever 24.

In operation the device is grasped in the hand by the hand-grip 11 with the fingers extending under bar 20 with the bar 20 forced downwardly by spring 29 which holds blades 33 and 31 in spaced relation and the points of blades 33 and 31 positioned on opposite sides of plant to be extracted and then forced downwardly into the ground parallel with the plant by a downward thrust on hand-grip 11. When operating bar 20 is drawn upwardly by the fingers forcing the point of blade 31 toward the point of blade 33 which results in the root of the plant being clamped between the blades and the device drawn upwardly the plant will be extracted bodily from the ground.

Having thus described my invention what I claim is:

1. A plant extractor comprising a frame having a substantially rectangular hand grip at one of its ends and terminating in a blade like portion at the other of its ends, said hand grip having two parallel portions, an operating bar pivoted at one of its ends to one of said portions, a bell crank lever pivotally related to the frame intermediate the blade like portion and the hand grip, a complementary blade carried by the bell crank lever, and a link operably relating the bar and the bell crank lever.

2. A plant extractor comprising a frame having a substantially rectangular hand grip at one of its ends and terminating in a blade like portion at the other of its ends, an operating bar pivoted at one of its ends to one side of the hand grip, a bell crank lever pivotally related to the frame intermediate the blade like portion and the hand grip, and a link operably relating the bar and the bell crank lever, a complementary blade carried by the bell crank lever, the blade like portion being in virtual alignment with the center of the hand grip.

3. A plant extractor comprising a frame having a substantially rectangular hand grip at one of its ends and terminating in a blade like portion at the other of its ends, said hand grip having two parallel portions, an operating bar pivoted at one of its ends to one side of the hand grip, a bell crank pivotally related to the frame intermediate the blade like portion and the hand grip, a complementary blade carried by the bell crank, and a link passing through one of the portions of the hand grip and pivotally connecting the bar and the bell crank.

4. A plant extractor comprising a frame forming a hand grip open at one of its sides at one end of the frame, said frame terminating in a blade like portion at the other of its ends, an operating bar pivoted at one of its ends to one side of the hand grip, a bell crank pivotally related to the frame and intermediate the hand grip and the blade like portion, a complementary blade carried by the bell crank, and a link operably relating the bar and the bell crank.

5. A plant extractor comprising a frame having a substantially rectangular hand grip at one of its ends and terminating in a blade like portion at the other of its ends, an operating bar pivoted at one of its ends to one side of the hand grip, a bell crank lever pivotally related to the frame intermediate the blade like portion and the hand grip, a complementary blade carried by the bell crank lever, and a link operably relating the bar and the bell crank lever, the frame being recessed to permit of the free movement of the bar, link and bell crank lever.

6. A plant extractor comprising a frame having a substantially rectangular hand grip at one of its ends and terminating in a blade like portion at the other of its ends, an operating bar pivoted at one of its ends to one side of the hand grip, a bell crank lever pivotally related to the frame intermediate the blade like portion and the hand grip, a complementary blade carried by the bell crank lever, a link operably relating the bar and the bell crank lever, the blade like portion being in virtual alignment with the center of the hand grip, and a compression spring interposed between the hand grip and the operating bar.

7. A device of the character described comprising a frame substantially of the configuration of an interrogation point, the depending portion terminating in a blade like member, the upper portion forming a hand grip, an operating bar pivotally related to the downwardly extending portion of the hand grip, a bell crank pivotally related to the depending blade like portion, a complementary blade carried by the bell crank, a link pivotally related at one of its ends to the operating bar and pivotally related to the bell crank at the other of its ends, and a compression spring interposed between the top of the hand grip and the operating bar.

8. A plant extractor comprising a frame having a substantially rectangular hand grip at one of its ends and terminating in a blade-like portion at the other of its ends, said hand grip having two parallel portions, an operating bar pivoted at one of its ends to one of the portions, a bell crank pivotally related to the frame intermediate the blade-like portion and the hand grip, a complementary blade carried by the bell crank, and a link passing through the hand grip and pivotally connecting the bar and bell crank.

In testimony whereof I have hereunto set my hand.

FREDERICK W. BUSER.